(12) United States Patent
Morasse

(10) Patent No.: US 6,763,745 B2
(45) Date of Patent: Jul. 20, 2004

(54) DEVICE FOR ATTACHING STRUCTURAL ELEMENTS

(75) Inventor: Louis Morasse, Bromont (CA)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 2 days.

(21) Appl. No.: 10/187,864

(22) Filed: Jul. 1, 2002

(65) Prior Publication Data

US 2003/0015073 A1 Jan. 23, 2003

(30) Foreign Application Priority Data

Jul. 4, 2001 (FR) ............................................ 01 08899

(51) Int. Cl.⁷ .......................... B25B 23/00; F16B 21/02
(52) U.S. Cl. ........................................ 81/436; 411/349
(58) Field of Search ........................... 81/436; 411/349, 411/549–555, 84, 85, 406, 407

(56) References Cited

U.S. PATENT DOCUMENTS

| | | | | |
|---|---|---|---|---|
| 2,304,704 A | * | 12/1942 | O'Leary ..................... | 411/406 |
| 2,552,066 A | * | 5/1951 | Sorensen .................... | 411/349 |
| 3,120,251 A | * | 2/1964 | York ........................... | 81/436 |
| 3,540,342 A | * | 11/1970 | Vaughn ...................... | 411/407 |
| 4,033,003 A | * | 7/1977 | Marroquin ................. | 470/8 |
| 4,146,073 A | * | 3/1979 | Lliteras ...................... | 81/436 |
| 4,442,571 A | * | 4/1984 | Davis et al. ................ | 411/552 |
| 5,165,882 A | * | 11/1992 | Shimizu et al. ............ | 418/270 |
| 5,193,961 A | * | 3/1993 | Hoyle et al. ............... | 411/553 |
| 5,246,322 A | * | 9/1993 | Salice ......................... | 411/15 |
| 5,367,926 A | | 11/1994 | Mikic et al. ................ | 81/436 |

FOREIGN PATENT DOCUMENTS

| | | |
|---|---|---|
| CH | 646570 | 12/1984 |
| DE | 8605955 | 5/1986 |
| FR | 2481388 | 10/1981 |
| GB | 614921 | * 12/1948 |

* cited by examiner

Primary Examiner—Joseph J. Hail, III
Assistant Examiner—David B. Thomas
(74) Attorney, Agent, or Firm—Jay L. Chaskin; Cantor Colburn LLP

(57) ABSTRACT

A device in the form of a quarter-turn device for attaching together structural element. The device has an attachment element passing through a hole in a first structural element, such as a cover, with a shank, a head and a part profiled so as to engage with a retaining element arranged on the structural element. The head, which may be circular, with a curved upper face, has a diametrical slot having a longitudinal profile with a bottom curved in a circular arc, the center of which is located at some distance above the head. The longitudinal ends of the slot open out from the upper face of the head at two points offset radially inwards with respect to the periphery or circumference of the head.

16 Claims, 2 Drawing Sheets

DEVICE FOR ATTACHING STRUCTURAL ELEMENTS

CROSS-REFERENCE TO RELATED APPLICATIONS

The application claims the benefit of a priority under 35 USC 119 to French Patent Application No. 01 08899 filed Jul. 4, 2001, the entire contents of which are hereby incorporated by reference.

BACKGROUND OF THE INVENTION

The present invention relates to a device for attaching structural elements and, in particular, a first structural element to a second structural element. In particular, the present invention relates to device for attaching a cover or similar element to a structural element. In particular, the present invention is directed to a quarter-turn device. The device has practical application in many fields of technology and especially in the field of medical equipment.

Quarter-turn attachment devices are well known. These devices generally comprise an attachment element passing through a hole in the cover and a retaining element placed on the structural element. The attachment element generally comprises a shank having at one end a head and at the other end a part which is profiled so that it can be engaged in, and withdrawn from the retaining element, generally along the axis of the shank, in a first angular position of the attachment element, and so that it can be retained in the retaining element in a second angular position offset by 90° with respect to the first angular position. In general, the heads has a circular shape with a working recess in the form of a diametrical slot in the upper face of the head.

These attachment devices are commonly used in numerous applications. However, there are certain fields of applications, such as, in the field of medical equipment, and more particularly, radiology equipment, in which there are particular problems. These particular problems include, for example, hygiene, ease of cleaning and safety (the impossibility or at least the difficulty of application by unskilled persons). As a consequence, the known quarter-turn devices are not entirely satisfactory.

BRIEF DESCRIPTION OF THE INVENTION

An embodiment of the present invention is a quarter-turn attachment device, which addresses the problems of, for example, hygiene, ease of cleaning and safety.

The quarter-turn device for attaching a cover or a similar element to a structural element comprises an attachment element passing through a hole in the cover and a retaining element arranged on the structural element. The attachment element comprises a shank having an axis and comprising at one end a head and at the other end a part that is profiled so that it can be engaged in, and withdrawn from, the retaining element, generally along the axis of the shank, in a first angular position of the attachment element. Further, the device can be retained in the retaining element in a second angular position offset by 90° with respect to the first angular position. The head may have a periphery, generally circular shape, with an upper face and with a recess in the form of a diametrical slot in the upper face. The slot has a generally longitudinal profile with a curved bottom in the shape of a circular arc, the center of which is located at some distance above the head, such that the two opposed longitudinal ends of the slot open out from the upper face of the head at two points offset radially inwards with respect to the circumference of the head.

In an embodiment, the upper face of the head is curved in a convex manner with a radius of curvature, which may be substantially equal to the diameter of the head.

In an embodiment, the slot has a transverse profile with a bottom curved in a concave manner.

In an embodiment, the width of the slot is at least equal to and greater than the maximum depth of the slot at the center of the head.

In an embodiment, the radius of curvature of the circular-arc-shaped bottom of the longitudinal profile of the slot may be substantially equal to the diameter of the head.

In an embodiment, the attachment element may be fitted with a sealing element, which is placed between the lower face of the head and the cover to be attached. The sealing element may have an outer diameter greater than the diameter of the head.

In an embodiment, the sealing element in the form of an annular seal has an outer peripheral edge profiled such that the edge of the seal provides continuity substantially without a shoulder between the head and the cover.

In an embodiment, the cover to be attached may be fitted, in the region of the hole designed for the attachment element to pass through, with a cavity having a diameter and a depth such that the head of the attachment element and the sealing element inserted between the head and the cover substantially fill the cavity.

In an embodiment, the attachment device comprises a special tool for applying the attachment element. This tool comprises a flat part in the shape of a sector of a disc having a radius of curvature corresponding to the radius of curvature of the bottom of the longitudinal profile of the slot of the head of the attachment element and a peripheral transverse profile corresponding to the bottom of the transverse profile of the slot.

BRIEF DESCRIPTION OF THE DRAWING

The invention will be described with respect to the drawings, in which.

DETAILED DESCRIPTION OF THE INVENTION

Figure 1:
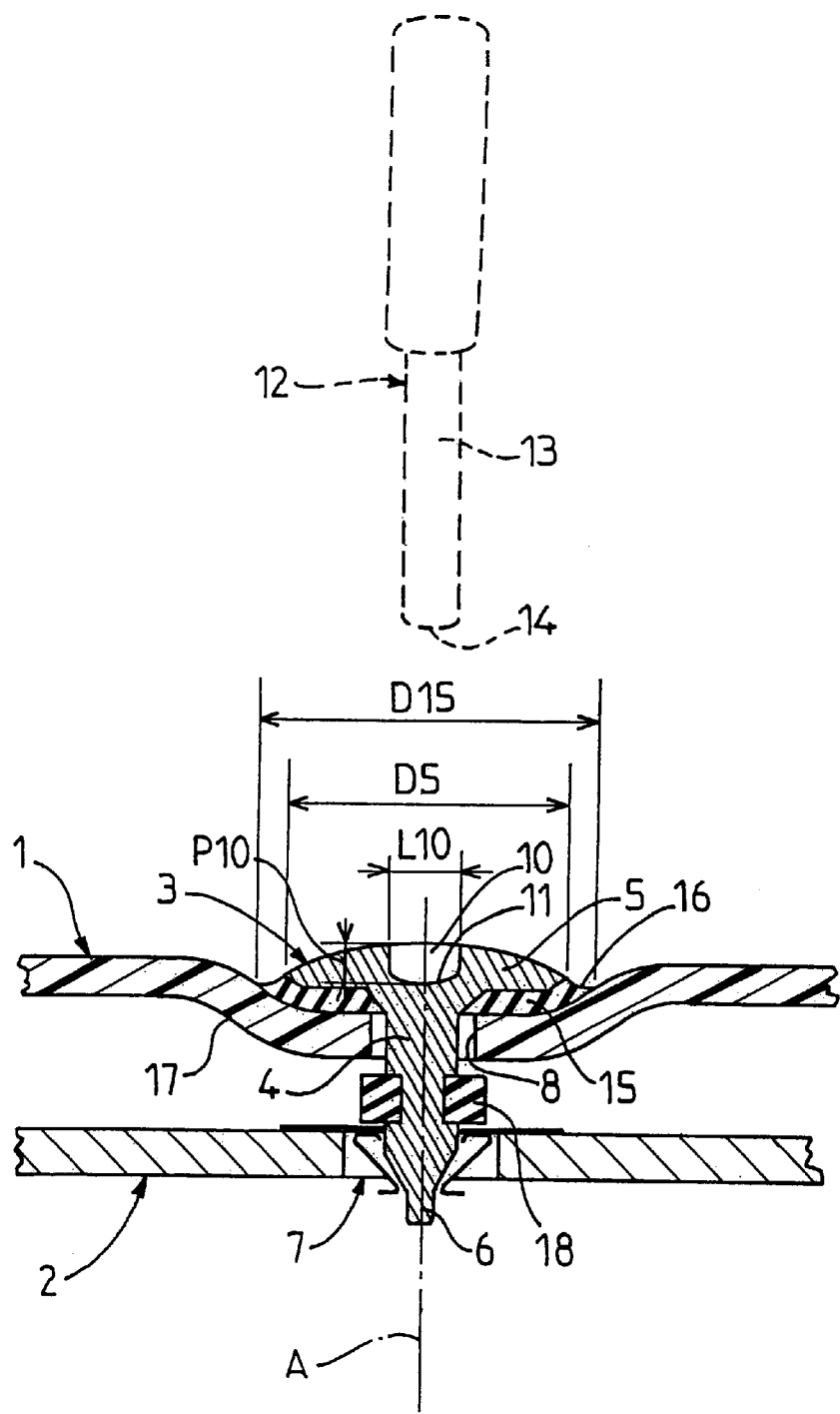
FIG. 1 is a section of the device in the angular position of engagement and of withdrawal of the attachment element.

A device for attaching a cover 1 to a structural element 2 comprises an attachment element 3 of the quarter-turn type. The attachment element 3 comprises a shank 4 having an axis A and bearing at one end a head 5 and at its opposed end a profiled part 6 shaped so as to be able to engage with a retaining element 7 arranged on the structural element 2, the shank 4 passing through a hole 8 in the cover 1.

The attachment element 3 and the retaining element 7, engage respectively, with the cover 1 and with the structural element 2 and engage one with the other. The profiled part 6 of the element 3 is shaped so that it can be engaged in the retaining element 7 and be withdrawn from the latter along the axis A of the shank 4, in a first angular position of the attachment element 3, as shown in FIG. 2; and that it can be retained in the retaining element 7 in a second angular position, as shown in FIG. 1, in which the element 3 is offset angularly by 90° with respect to the first position, about the axis A.

The head 5 may have a circular shape with an upper face 9 curved in a convex manner, and with a recess 10 in the form of diametrical slot made in the upper curved face 9.

Figure 2:
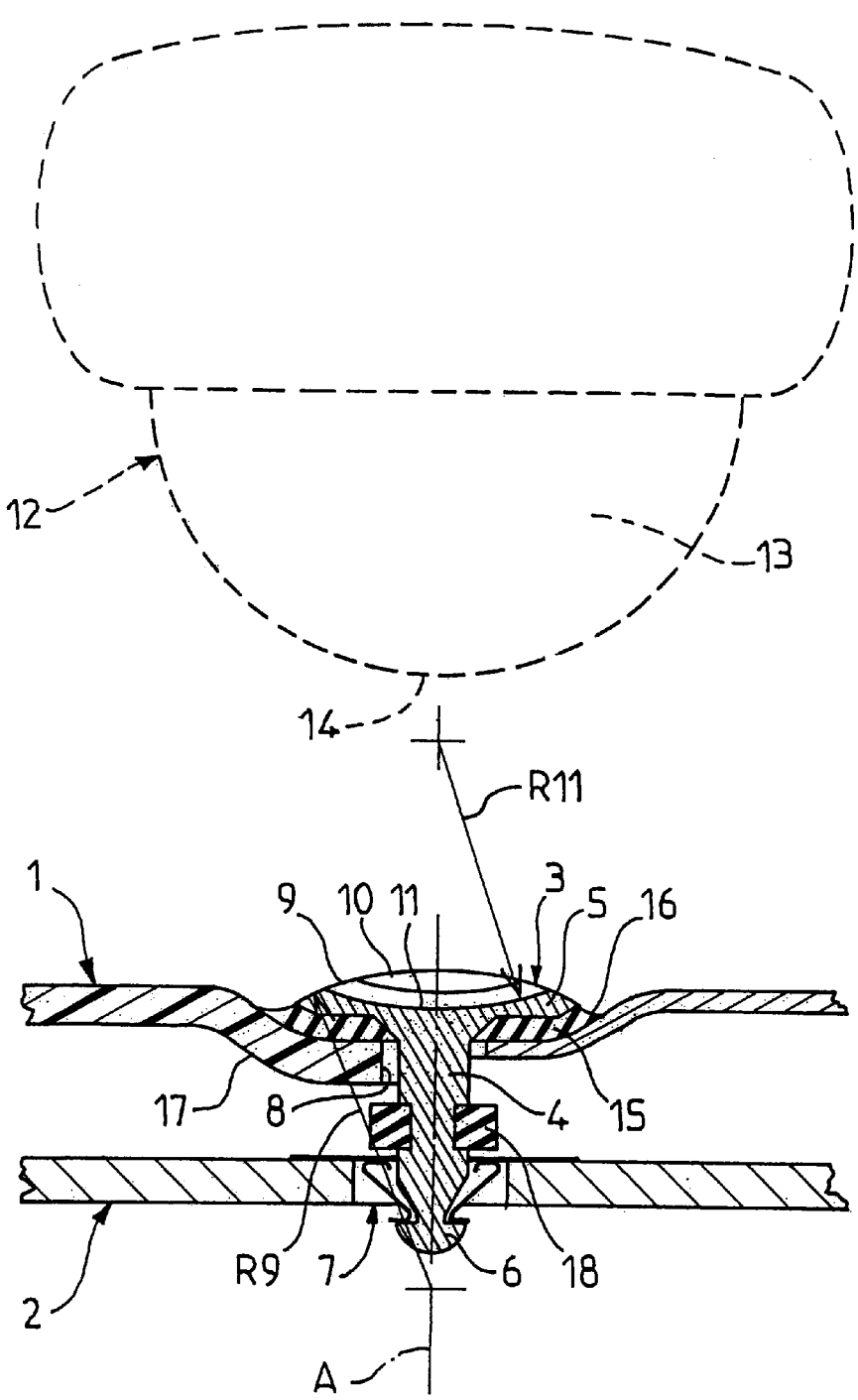
FIG. 2 is a section of the device in the angular position of retaining the attachment element.

As is shown in FIG. 2, the slot 10 has a longitudinal profile with a bottom 11 curved in a circular arc of radius R11, the center of which is located at some distance above the head 5.

The radius of curvature R9 of the upper curved face 9 of the head 5 is slightly greater than the diameter D5 of the head 5, and the radius of curvature R11 of the bottom 11 of the slot 10 is substantially equal to the diameter D5. As shown in FIG. 2, the two longitudinal ends of the slot 10 open out on the upper curved face 9 of the head 5 at points offset radially inwards (towards the center of the head) with respect to the circumference of the head, the bottom 11 of the slot thus making, at the ends, an angle on the order of 45° with the upper curved face 9 of the head 5.

As seen in FIG. 1, the width L10 of the slot 10 is at least equal to and generally greater than the maximum depth of the slot 10 at the center of the head 5. As shown in FIG. 1 (in the transverse profile), the bottom 11 of the slot 10 is not flat, but is curved in a concave manner. In the case of a circular arc, the bottom 11 joins the parallel sides of the slot 10 with curves.

The attachment element 3 can be applied using any suitable tool capable of engaging with the slot 10. However, given the longitudinal profile and the transverse profile of the slot 10, a tool 12 is shown in dashed lines in FIGS. 1 and 2. This tool comprises a flat part 13 in the shape of a sector of a disc having a thickness corresponding to the width L10 of the slot 10, a radius of curvature corresponding to the radius of curvature R11 of the bottom 11 of the longitudinal profile of the slot 10, and a peripheral transverse profile 14 corresponding to the transverse profile of the slot 10.

To provide a degree of sealing of the cover 1 at the location of the head 5 of the attachment element 3, a seal 15 may be combined with the element 3. The seal 15 is placed between the lower face of the head 5 and the cover 1. Preferably, the seal 15 has an outer diameter D15 greater than the diameter of the head 5. The seal 15 comprises a peripheral edge 16 profiled such that the edge provides continuity substantially without a shoulder between the head 5 and the cover 1.

The cover 1 comprises, at the location intended to receive the head 5 of the attachment element 3 a circular cavity 17 of a diameter slightly greater than the diameters D5 and D15 of the head 5 and of the seal 15, and a depth substantially equal to the thickness of the head 5 and of the seal 15, such that the head 5 and the seal 15 inserted between the head 5 and the bottom of the cavity 17 substantially fill the cavity.

The attachment element 3 may be fitted with an element 18 which makes it "captive", i.e., prevents it from falling from the cover 1 when it is disengaged form the retaining element 7. In the embodiment shown in the figures, this element 18 comprises a washer made of rubber or of another elastomer, retained in a groove of the shank 4.

As shown in FIG. 2, the attachment element 3 can be used equally for covers 1 of different thickness, for example, thicker covers made of plastic as in the left half and thinner covers made of metal as in the right half of FIG. 2. The attachment element 3 may be made of metal, preferably of a metal, which is non-oxidizing or anticorrosion-treated.

Various modifications in the structure and/or steps and/or functions or equivalents thereof of the disclosed embodiments may be made by one skilled in the art without departing from scope and extent of the invention as recited in the claims.

What is claimed is:

1. A device for attaching a first structural element to a second structural element comprising:

a hole in the first structural element an attachment element for passing through the hole;

a retaining element arranged on the second structural element;

the attachment element comprising a shank having an axis and a head at one end and a part which is profiled so that it can engage in, and be withdrawn from, the retaining element along the axis in a first angular position of the attachment element;

the part being retained in the retaining element in a second angular position offset with respect to the first angular position;

the head having an upper face with a recess substantially across the upper face;

the recess comprising a slot having in a longitudinal profile a bottom curved in a circular arc, the center of the arc being located at some distance above the head such that opposed longitudinal ends of the slot open out from the upper face of the head at points offset radially inwards with respect to the perimeter of the head;

wherein the slot has a transverse profile with a concave curved bottom; and wherein the slot has a width that is at least equal to a maximum depth of the slot at the center of the head.

2. The device according to claim 1 wherein the upper face is curved in a convex manner with a radius of curvature that is substantially equal to a dimension of the head.

3. The device according to claim 2 wherein the slot has a transverse profile with a concave curved bottom.

4. The device according to claim 2 wherein the slot has a width that is at least equal to a maximum depth of the slot at the center of the head.

5. The device according to claim 4 wherein the width of the slot is greater than the maximum depth of the slot at the center of the head.

6. The device according to claim 1 wherein the slot has a width that is at least equal to a maximum depth of the slot at the center of the head.

7. The device according to claim 6 wherein the width of the slot is greater than the maximum depth of the slot at the center of the head.

8. The device according to claim 1 wherein the width of the slot is greater than the maximum depth of the slot at the center of the head.

9. The device according to claim 1, wherein the head has a substantially circular shape; and the radius of curvature of the circular arc shaped bottom of he longitudinal profile of the slot is substantially equal to a diameter of the head.

10. The device according to claim 1 wherein the head has a substantially circular shape; and the radius of curvature of the circular arc shaped bottom of he longitudinal profile of the slot is substantially equal to a diameter of the head.

11. The device according to claim 1 further comprising:

a sealing element between a lower face of the head of the attachment element and the first structural element; and the sealing element having an outer dimension greater than the outer dimension of the head.

12. The device according to claim 11 wherein the first structural element has a cavity at the location of the attachment element, the cavity has an outer dimension and a depth such that the head and the sealing element arranged between the latter and the cavity substantially fill the cavity.

13. The device according to claim 1 in combination, a tool for operating the device comprising:
   a flat part in the shape of a segment of a disc having a thickness corresponding to a width of the slot;
   a radius of curvature corresponding to the radius of curvature of the bottom of the longitudinal profile of the slot; and
   a peripheral transverse profile corresponding to the transverse profile of the slot at the head of the attachment element.

14. A device for attaching a first structural element to a second structural element comprising:
   a hole in the first structural element;
   an attachment element for passing through the hole;
   a retaining element arranged on the second structural element;
   the attachment element comprising a shank having an axis and a head at one end and a part which is profiled so that it can engage in, and be withdrawn from, the retaining element along the axis in a first angular position of the attachment element;
   the part being retained in the retaining element in a second angular position offset with respect to the first angular position;
   the head having an upper face with a recess substantially across the upper face;
   the recess comprising a slot having in a longitudinal profile a bottom curved in a circular arc, the center of the arc being located at some distance above the head such that opposed longitudinal ends of the slot open out from the upper face of the head at points offset radially inwards with respect to the perimeter of the head;
   wherein the width of the slot is greater than the maximum depth of the slot at the center of the head;
   wherein the head has a substantially circular shape; and
   wherein the radius of curvature of the circular arc shaped bottom of he longitudinal profile of the slot is substantially equal to a diameter of the head.

15. A device for attaching a first structural element to a second structural element comprising:
   a hole in the first structural element;
   an attachment element for passing through the hole;
   a retaining element arranged on the second structural element;
   the attachment element comprising a shank having an axis and a head at one end and a part which is profiled so that it can engage in, and be withdrawn from, the retaining element along the axis in a first angular position of the attachment element;
   the part being retained in the retaining element in a second angular position offset with respect to the first angular position;
   the head having an upper face with a recess substantially across the upper face;
   the recess comprising a slot having in a longitudinal profile a bottom curved in a circular arc, the center of the arc being located at some distance above the head such that opposed longitudinal ends of the slot open out from the upper face of the head at points offset radially inwards with respect to the perimeter of the head;
   a sealing element between a lower face of the head of the attachment element and the first structural element;
   wherein the sealing element has an outer dimension greater than the outer dimension of the head; and
   wherein the sealing element has a peripheral edge profiled such that the edge of the seal provides continuity between the head of the attachment element and the first structural element.

16. The device according to claim 15 wherein the first structural element has a cavity at the location of the attachment element, the cavity has an outer dimension and a depth such that the head and the sealing element arranged between the latter and the cavity substantially fill the cavity.

* * * * *